(12) United States Patent
Coscia et al.

(10) Patent No.: US 10,807,867 B2
(45) Date of Patent: Oct. 20, 2020

(54) STEAM REFORMER FOR PRODUCING SYNTHESIS GAS

(71) Applicant: L'Air Liquide, Societe Anonyme pour l'Etude et l'Exploitation des Procedes Georges Claude, Paris (FR)

(72) Inventors: Antonio Coscia, Hadamar (DE); Nathanael Hassler, Oberursel (DE)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 0 days.

(21) Appl. No.: 15/766,267

(22) PCT Filed: Sep. 28, 2016

(86) PCT No.: PCT/EP2016/025105
§ 371 (c)(1),
(2) Date: Apr. 5, 2018

(87) PCT Pub. No.: WO2017/059963
PCT Pub. Date: Apr. 13, 2017

(65) Prior Publication Data
US 2019/0119108 A1    Apr. 25, 2019

(30) Foreign Application Priority Data
Oct. 5, 2015  (EP) .................................... 15400043

(51) Int. Cl.
*C01B 3/38*   (2006.01)
(52) U.S. Cl.
CPC ...... *C01B 3/384* (2013.01); *C01B 2203/0233* (2013.01); *C01B 2203/0816* (2013.01)

(58) Field of Classification Search
CPC ..................................................... C01B 3/384
See application file for complete search history.

(56) References Cited

U.S. PATENT DOCUMENTS

| 3,453,087 | A | * | 7/1969 | Alvin, Jr. | ................. | B01J 8/062 422/625 |
| 2004/0134127 | A1 | * | 7/2004 | Pham | ...................... | B01J 8/062 48/198.7 |
| 2008/0247942 | A1 | * | 10/2008 | Kandziora | ............... | B01J 8/062 423/651 |

FOREIGN PATENT DOCUMENTS

| DE | 10 2005 020943 A1 | 11/2006 |
| DE | 10 2011 118217 A1 | 5/2013 |
| EP | 1 193 219 A1 | 4/2002 |

OTHER PUBLICATIONS

International Search Report and Written Opinion for PCT/EP2016/025105, dated Dec. 8, 2016.

(Continued)

*Primary Examiner* — Douglas B Call
(74) *Attorney, Agent, or Firm* — Justin K. Murray

(57) ABSTRACT

A steam reformer, comprising a combustion chamber, catalyst tubes arranged in several rows, feed conduits for the educt gas, which extend below the bottom of the combustion chamber, burners for heating the catalyst tubes which are installed in the bottom of the combustion chamber and are directed vertically upwards into the combustion chamber, feed conduits extending below the bottom of the combustion chamber, each for supplying the air and the fuel gas to the burners, openings installed in the ceiling of the combustion chamber for discharging the burner waste gas, and channels extending above the ceiling of the combustion chamber for discharging the burner waste gas.

6 Claims, 2 Drawing Sheets

(56) References Cited

OTHER PUBLICATIONS

Farhadi, et al., "Radiative Modies for the Furnace Side of a Bottom-Fired Reformer," Applied Thermal Engineering, Pergamon, Oxford, GB, vol. 25, No. 14-15, Oct. 2005, pp. 2398-2411.
"Primary Reformer Problems," Nitrogen and Methanol, British Sulphur Publishing, London, GB, No. 250, Mar. 2001, pp. 30-32, 34.

* cited by examiner

STEAM REFORMER FOR PRODUCING SYNTHESIS GAS

CROSS REFERENCE TO RELATED APPLICATIONS

This application is a § 371 of International PCT Application PCT/EP2016/025105, filed Sep. 28, 2016, which claims the benefit of EP154400043.4, filed Oct. 5, 2015, both of which are herein incorporated by reference in their entireties.

FIELD OF THE INVENTION

This invention relates to a steam reformer for the conversion of gas rich in hydrocarbons with steam into a synthesis gas rich in carbon monoxide and hydrogen.

This invention furthermore relates to a process for producing a synthesis gas rich in carbon monoxide and hydrogen by steam reformation of a gas rich in hydrocarbons.

BACKGROUND OF THE INVENTION

Steam reformers for the conversion of gaseous hydrocarbons with steam into synthesis gas chiefly consisting of carbon monoxide (CO) and hydrogen ($H_2$) are known. The steam reformation process is described in principle, for example in Ullmann's Encyclopedia of Industrial Chemistry, Sixth Edition, Vol. 15, chapter "Gas Production", Chapter 2.2. The different types of tubular reactors proven for this process are described in principle in chapter 2.2.3 of the same volume. This chapter describes tubular reactors in which the burners are installed in the roof or in the bottom or in the side walls of the reformer housing. The present invention relates to reformers in which the burners are installed in the roof or in the bottom of the housing. Within this category, the variant with the burners installed in the roof, as they are shown in FIG. 6 of this Ullmann chapter, so far largely has gained acceptance. In this variant, all feed conduits, i.e. conduits for supplying the burners with fuel gas and the educt gas conduits for the reformer tubes, are arranged on the roof, and all discharge conduits, such as the conduit for the discharge of the burner waste gases and the product gas from the reformer tubes, are arranged at the bottom of the reformer housing. It is particularly favorable to discharge the product gases at the bottom of the housing, as their temperature lies in the range of 900° C. and after leaving the reformer they are passed through a waste heat boiler for heat recovery. Since a waste heat boiler is so heavy that an installation only makes sense at ground level, a withdrawal of the product gases at the bottom of the reformer housing leads to a short conduit path to the waste heat boiler and hence also to little heat losses in the conduit.

On the other hand, the installation of the educt gas conduits and the fuel gas conduits on the roof of the reformer housing is unfavorable for several reasons. These conduits impair the accessibility of the reformer tubes which can only be exchanged through the roof. In addition, for the maintenance of the burners and for checking the conduits the roof must safely be accessible and walkable for personnel.

What is particularly unfavorable is the arrangement of the educt gas conduits on the roof of the reformer housing in the case of reformer tubes with integrated heat exchange between the educt gases and the product gases. Such reformer tubes are described for example in the document DE 102011118217 A1. As in these reformer tubes the product gas outlet is arranged on the same side as the educt gas inlet, the product gas conduits hence must also be arranged on the roof of the reformer housing, whereby the supply of the product gases to the waste heat boiler and the arrangement of the waste heat boiler becomes more difficult.

BRIEF DESCRIPTION OF THE INVENTION

Therefore, it is the object of the present invention to provide a steam reformer in which the disadvantages of the prior art are avoided. This object is solved by a steam reformer according to the features of independent claim 1 and, in an alternative aspect of the invention, of independent claim 2.

Steam Reformer According to an Embodiment of the Invention:

A steam reformer, comprising:
a combustion chamber with a bottom, a ceiling and side walls terminating the combustion chamber,
catalyst tubes arranged in several rows with integrated recirculation of the product gas, which penetrate through the bottom of the combustion chamber, wherein the catalyst tubes are arranged such that the tube ports for the educt gas conduits and product gas conduits are located at the end of the catalyst tubes protruding downwards out of the combustion chamber,
feed conduits for the educt gas and collecting conduits for the product gas, which extend below the bottom of the combustion chamber,
burners for heating the catalyst tubes, which are installed in the bottom of the combustion chamber and are directed vertically upwards into the combustion chamber,
feed conduits extending below the bottom of the combustion chamber, each for supplying the air and the fuel gas to the burners,
openings installed in the ceiling of the combustion chamber for discharging the burner waste gas,
channels extending above the ceiling of the combustion chamber for discharging the burner waste gas.

Steam Reformer According to the Invention in an Alternative Configuration:

A steam reformer, comprising:
a combustion chamber with a bottom, a ceiling and side walls terminating the combustion chamber,
catalyst tubes arranged in several rows, which penetrate the bottom and the ceiling of the combustion chamber, wherein the catalyst tubes are arranged such that the tube ports for the educt gas conduits are located at the end of the catalyst tubes protruding downwards out of the combustion chamber, and the tube ports for the product gas conduits are located at the end of the catalyst tubes protruding upwards out of the combustion chamber,
feed conduits for the educt gas, which extend below the bottom of the combustion chamber,
collecting conduits for the product gas, which extend above the ceiling of the combustion chamber,
burners for heating the catalyst tubes, which are installed in the bottom of the combustion chamber and are directed vertically upwards into the combustion chamber,
feed conduits extending below the bottom of the combustion chamber, each for supplying the air and the fuel gas to the burners,
openings installed in the ceiling of the combustion chamber for discharging the burner waste gas, channels extending above the ceiling of the combustion chamber for discharging the burner waste gas.

In a reformer according to claim 1, one of the features consists in that there are used catalyst tubes with integrated recirculation of the product gas as they are described in the unexamined German application DE 102011118217 A1. In this technology, the inlets for the educt and product gases are located at the same end of the catalyst tube. The collecting conduits for these cases thereby can be installed completely below the bottom of the reformer housing.

On the other hand, in a reformer according to the second independent claim 2, one of the features consists in that there are used catalyst tubes without integrated recirculation of the product gas. The catalyst tubes protrude out of the bottom and the ceiling of the reformer housing, the educt gases are introduced into the catalyst tubes at the bottom, and the product gases are collected and discharged from the catalyst tubes through the roof of the housing.

One advantage of the reformers according to the invention consists in that the withdrawal of the burner waste gases is effected at the top on the reformer roof, i.e. in convection direction of the waste gases. In this way, compressor and blower power can be saved, as the burner waste gases are easier to suck off.

Furthermore, the arrangement of the feed conduits and discharge conduits for educts, products, combustion air and fuel gases at or below the reformer bottom according to the invention provides for a very symmetrical and compact construction of the combustion chamber, whereby heat losses and the fuel demand are reduced.

What also is favorable is the better accessibility of the reformer tubes through the roof as compared to conventional reformers, so that in a service case they can be demounted towards the top and be exchanged more easily. The same applies for a possibly required exchange of the catalyst in the tubes, wherein the deactivated catalyst favorably is removed from above, e.g. by sucking off, and the new catalyst likewise can be introduced from above by pouring the same into the reformer tubes.

Due to the very short coupling of the product conduits to downstream apparatuses, e.g. waste heat boilers, according to the invention the risk of the metal-dusting corrosion also is reduced apart from the reduction of heat losses.

The arrangement of the burners on the bottom of the combustion chamber according to the invention makes the same easily accessible in a service case. Furthermore, the bottom plate absorbs the load of the burner-fuel gas-air supply system, so that the reformer roof is relieved correspondingly.

The access to the plant sections arranged at or below the bottom of the combustion chamber is ensured by the arrangement of a walkable intermediate plane between the bottom of the combustion chamber and the erection base.

The invention furthermore includes a process for the catalytic conversion of hydrocarbonaceous gas with steam into a synthesis gas containing hydrogen and carbon oxides, comprising the following process steps:
a) providing a hydrocarbonaceous gas and steam,
b) producing an educt gas by mixing the gas and the steam,
c) converting the educt gas into a synthesis gas comprising hydrogen and carbon oxides by conversion in a steam reformer according to claims 1 to 5 under reforming conditions,
d) discharging the synthesis gas for the further treatment outside the process.

Reforming conditions are understood to be the operating conditions of the reformer plant well known to the skilled person, which ensure a technically and economically expedient degree of conversion of the feedstocks to synthesis gas components.

PREFERRED ASPECTS OF THE INVENTION

A preferred aspect of the invention consists in that the integrated recirculation of the product gas in the catalyst tubes is effected by a heat exchanger each integrated into the tubes, via which a heat exchange between the educt gas and the product gas flowing in the catalyst tube is effected. This technology also is described in the unexamined German application DE 102011118217 A1. In this way, heat is transferred from the hot product gas to the educt gas, whereby heating energy is saved and heating and hence the conversion of the educt gases is accelerated.

Another preferred aspect of the invention consists in that at their upper end the catalyst tubes are equipped with closable openings for exchanging the catalyst. Through these openings spent catalyst can be removed from the tubes, e.g. by sucking off, and new catalyst can be filled in.

Another preferred aspect of the invention consists in that the ceiling of the combustion chamber includes openings through which demounted catalyst tubes can be removed from the combustion chamber towards the top. As according to the invention the burners are installed in the reformer bottom, space is gained on the reformer roof, whereby the exchange of catalyst tubes through the roof is facilitated.

BRIEF DESCRIPTION OF THE DRAWINGS

Further features, advantages and possible applications of the invention can also be taken from the following description of exemplary embodiments and the drawings. All features described and/or illustrated form the subject-matter of the invention per se or in any combination, independent of their inclusion in the claims or their back-reference.

FIG. 1 shows a sectional drawing of an exemplary steam reformer according to a first aspect of the invention, as seen from the front.

DETAILED DESCRIPTION OF THE INVENTION

Figure 1:
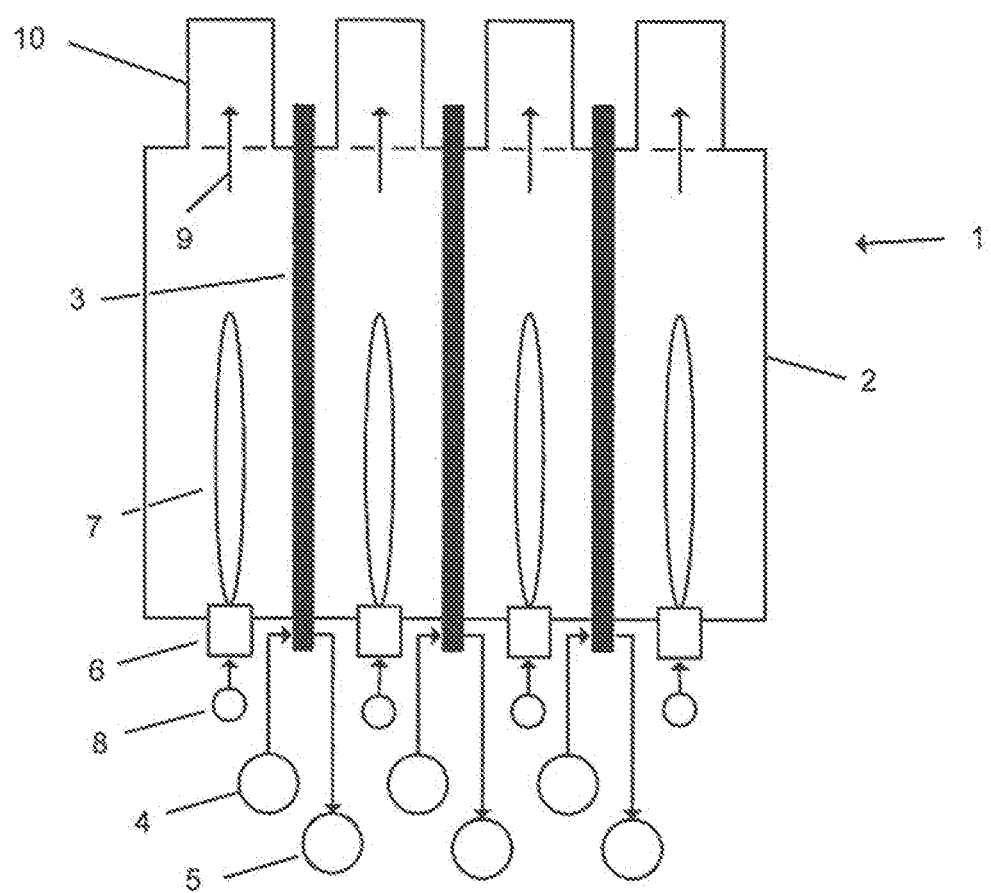
With reference to FIG. 1 of the drawing, one of the possible embodiments of a steam reformer according to the invention will be explained. In the only Figure

The steam reformer 1 as shown in FIG. 1 corresponds to an aspect of the invention according to claim 1 and comprises the reformer housing 2. The interior of the reformer housing 2 often also is referred to as combustion chamber. For illustration, the reformer 1 in this example is equipped with three rows of catalyst tubes 3. The tubes 3 penetrate through the ceiling of the reformer housing 2. As a result, they are easily accessible for maintenance work. The tubes are equipped with an internal recirculation of the product gas, so that both the supply with educt gas and the discharge of the product gas is effected from the same side of the tube at or below the bottom of the combustion chamber. The collecting conduits for the educt gas 4 and for the product gas 5 extend below the reformer bottom in parallel to the rows of catalyst tubes. In the reformer bottom, the burners 6 are arranged in four rows, to the left and right, and between the rows of catalyst tubes. The burners 6 are aligned such that their flames 7 are directed vertically upwards into the reformer housing 2. The collecting conduits for the fuel gas 8 and the combustion air (not illustrated) also extend below the bottom of the reformer housing 2, in parallel to the burner rows. The waste gas 9 of the burners passes through openings in the ceiling of the reformer housing 2 into the waste gas channels 10. Four waste gas channels 10 are arranged on the housing in parallel to the rows of catalyst tubes.

Figure 2:
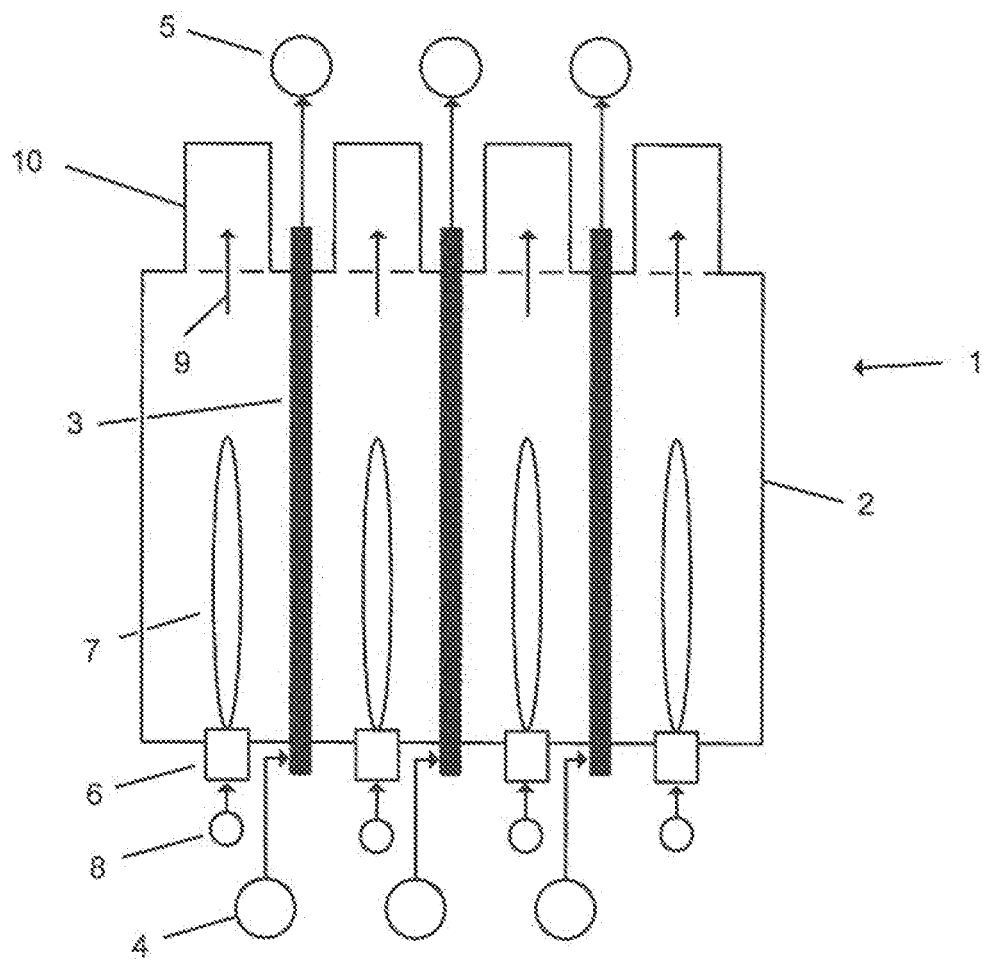
FIG. 2 shows a sectional drawing of an exemplary steam reformer according to a second aspect of the invention, as seen from the front.

The steam reformer 1 as shown in FIG. 2 corresponds to an aspect of the invention according to claim 2. The collecting conduits for the product gas 5 here are located above the ceiling of the reformer housing 2.

INDUSTRIAL APPLICABILITY

The invention provides a steam reformer which can be operated and maintained more easily and offers certain advantages with respect to the energy demand and the erection possibilities. The invention hence provides an economic advantage over the reformers known from the prior art and therefore is industrially applicable in an advantageous way.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

LIST OF REFERENCE NUMERALS 1 steam reformer
2 reformer housing
3 catalyst tubes
4 collecting conduit educt gas
5 collecting conduit product gas
6 burner
7 burner flame
8 collecting conduit fuel gas
9 burner waste gas
10 waste gas channel

The invention claimed is:

1. A steam reformer, comprising:
   a combustion chamber with a bottom, a ceiling and side walls terminating the combustion chamber;
   catalyst tubes arranged in several rows within the combustion chamber, wherein the catalyst tubes penetrate through the bottom of the combustion chamber, wherein the catalyst tubes are configured with integrated recirculation of the product gas such that both a supply of an educt gas and a discharge of a product gas are effected from an end of the catalyst tubes protruding downwards out of the combustion chamber;
   educt feed conduits in fluid communication with the catalyst tubes and being configured to provide the educt gas to the catalyst tube and collecting conduits in fluid communication with the catalyst tubes and being configured to receive a product gas from the catalyst tubes, wherein the educt feed conduits and the collecting conduits are disposed below the bottom of the combustion chamber;
   burners configured to heat the catalyst tubes, wherein the burners are installed in the bottom of the combustion chamber and are directed vertically upwards into the combustion chamber;
   combustion feed conduits extending below the bottom of the combustion chamber, each for supplying the air and the fuel gas to the burners;
   openings installed in the ceiling of the combustion chamber; and
   channels extending above the ceiling of the combustion chamber and being in fluid communication with the openings such that burner waste gas traverses from within the combustion chamber through the openings and into the channels, thereby discharging the burner waste gas from the combustion chamber.

2. The steam reformer according to claim 1, wherein the integrated recirculation of the product gas in the catalyst tubes is effected by a heat exchanger each integrated into the tubes, via which a heat exchange between the educt gas and the product gas flowing in the catalyst tube is effected.

3. The steam reformer according to claim 1, wherein at each upper end the catalyst tubes are equipped with closable openings for exchanging catalyst.

4. The steam reformer according to claim 1, wherein the ceiling of the combustion chamber includes catalyst tube openings through which demounted catalyst tubes can be removed from the combustion chamber towards the top.

5. A steam reformer, comprising:
   a combustion chamber with a bottom, a ceiling and side walls terminating the combustion chamber;
   catalyst tubes arranged in several rows within the combustion chamber, wherein the catalyst tubes penetrate the bottom and the ceiling of the combustion chamber, wherein the catalyst tubes are arranged such that tube ports for educt gas conduits are located at an end of the catalyst tubes protruding downwards out of the combustion chamber and tube ports for the product gas conduits are located at an end of the catalyst tubes protruding upwards out of the ceiling of the combustion chamber;

educt feed conduits for the educt gas in fluid communication with the catalyst tubes and being configured to provide the educt gas to the catalyst tube, wherein the educt feed conduits extend below the bottom of the combustion chamber;

collecting conduits in fluid communication with the catalyst tubes and being configured to receive the product gas from the catalyst tubes, wherein the collecting conduits extend above the ceiling of the combustion chamber;

burners configured to heat the catalyst tubes, wherein the burners are installed in the bottom of the combustion chamber and are directed vertically upwards into the combustion chamber;

combustion feed conduits extending below the bottom of the combustion chamber, each for supplying the air and the fuel gas to the burners;

openings installed in the ceiling of the combustion chamber; and channels extending above the ceiling of the combustion chamber and being in fluid communication with the openings such that burner waste gas traverses from within the combustion chamber through the openings and into the channel, thereby discharging the burner waste gas from the combustion chamber.

6. A process for the catalytic conversion of hydrocarbonaceous gas with steam into a synthesis gas containing hydrogen and carbon oxides, comprising the following process steps:

a) providing a steam reformer according to claim 1 or claim 5;

b) providing a hydrocarbonaceous gas and steam;

c) producing an educt gas by mixing the hydrocarbonaceous gas and the steam;

d) converting the educt gas into a synthesis gas comprising hydrogen and carbon oxides by conversion in the steam reformer under reforming conditions; and e) discharging the synthesis gas for the further treatment outside the process.

\* \* \* \* \*